(12) United States Patent
Teboulle

(10) Patent No.: US 12,152,965 B2
(45) Date of Patent: Nov. 26, 2024

(54) FLUID METER ARRANGED TO DETECT A LEAK AND TO MAKE AN INSTALLATION SAFE

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Reuil Malmaison (FR)

( * ) Notice: Subject to any disclaimer, the term of this patent is extended or adjusted under 35 U.S.C. 154(b) by 387 days.

(21) Appl. No.: 17/229,451

(22) Filed: Apr. 13, 2021

(65) Prior Publication Data

US 2021/0325275 A1    Oct. 21, 2021

(30) Foreign Application Priority Data

Apr. 16, 2020   (FR) ...................................... 2003859

(51) Int. Cl.
    *G01F 15/00*      (2006.01)
    *G01F 15/02*      (2006.01)
    (Continued)

(52) U.S. Cl.
    CPC ......... *G01M 3/2876* (2013.01); *G01F 15/005* (2013.01); *G01F 15/007* (2013.01);
    (Continued)

(58) Field of Classification Search
    CPC .... G01M 3/2876; G01M 3/00; G01M 3/2807; G01F 15/005; G01F 15/007;
    (Continued)

(56) References Cited

U.S. PATENT DOCUMENTS

| | | | |
|---|---|---|---|
| 8,816,638 B2 * | 8/2014 | Vorenkamp | H02J 50/90 320/155 |
| 10,973,182 B1 * | 4/2021 | Bangerter | A01G 25/167 |

(Continued)

FOREIGN PATENT DOCUMENTS

| | | |
|---|---|---|
| CN | 206877108 U | 1/2018 |
| EP | 3690406 A1 * | 8/2020 |

(Continued)

*Primary Examiner* — Eyob Hagos
(74) *Attorney, Agent, or Firm* — Muncy, Geissler, Olds & Lowe, P.C.

(57) ABSTRACT

A fluid meter has a first communication interface and is connected to the cut-off unit having a communication interface. If the fluid flow rate remains greater than a first predetermined flowrate threshold for at least a first predetermined duration, to detect that there is a leak of fluid and to transmit an internal command frame incorporating a closing command to the communication interface of the cut-off unit. Following closing of the electromechanical valve, to acquire a first external command frame incorporating an opening command produced by the cut-off unit following manual action on an actuator member of the cut-off unit, to produce an internal command frame incorporating the opening command, and to transmit said internal command frame via the first communication interface to the communication interface of the cut-off unit in order to reopen the electromechanical valve.

11 Claims, 3 Drawing Sheets

(51) Int. Cl.
*G01F 15/04* (2006.01)
*G01M 3/00* (2006.01)
*G01M 3/28* (2006.01)
*H04Q 9/00* (2006.01)
*H04W 12/06* (2021.01)

(52) U.S. Cl.
CPC .......... *G01F 15/028* (2013.01); *G01F 15/043* (2013.01); *G01M 3/00* (2013.01); *H04Q 9/00* (2013.01); *H04W 12/06* (2013.01); *G01D 2204/26* (2021.05); *Y04S 20/30* (2013.01)

(58) Field of Classification Search
CPC ....... G01F 15/028; G01F 15/043; H04Q 9/00; H04Q 2209/47; H04Q 2209/60; H04Q 2209/75; H04Q 2209/883; H04W 12/06; H04W 4/80; H04W 4/70; G01D 2204/26; G01D 4/002; Y04S 20/30; G08C 17/02
See application file for complete search history.

(56) References Cited

U.S. PATENT DOCUMENTS

| | | | | |
|---|---|---|---|---|
| 2013/0008264 | A1* | 1/2013 | McDaniel | G01F 1/363 73/861.65 |
| 2014/0110613 | A1* | 4/2014 | Pitchford | F16K 31/082 251/129.01 |
| 2018/0106698 | A1* | 4/2018 | Karg | F16K 37/0091 |
| 2018/0291594 | A1* | 10/2018 | Hammond | G01F 1/667 |

FOREIGN PATENT DOCUMENTS

| | | |
|---|---|---|
| IL | 166838 A | 3/2012 |
| WO | WO-2016/025919 A1 | 2/2016 |

\* cited by examiner

FLUID METER ARRANGED TO DETECT A LEAK AND TO MAKE AN INSTALLATION SAFE

The invention relates to the field of smart fluid meters and to detecting leaks in installations connected to such meters.

BACKGROUND OF THE INVENTION

A gas distribution network comprises pipes connected to gas-consuming installations to which gas meters are connected.

A modern gas meter, also known as a "smart" gas meter, naturally includes a measuring device for measuring the gas consumption of an installation, and it also includes a processor module and a communication module.

The processor module enables the gas meter to perform a certain number of functions, and in particular to analyze various kinds of data, e.g. relating to the gas consumption of the installation, to the billing of the subscriber, to the state of the gas distribution network, or indeed to the operation of the gas meter itself.

The communication module enables the gas meter to communicate with an information system (IS) of the network operator, possibly via a data concentrator, or else via a gateway. The communication module may perform any type of communication, and for example communication via a cellular network of 2G, 3G, 4G, Cat-M, or NB-IoT type, communication using the long range (LoRa) protocol, radio communication using the Wize standard operating at the frequency of 169 megahertz (MHz), etc.

It is fundamental to be able, quickly and reliably, to detect a gas leak occurring in a subscriber's installation, and to act quickly to make said installation safe. Specifically, a gas leak may have catastrophic consequences: fire, explosion, poisoning, etc.

When a leak has been detected, and once the problem giving rise to the leak has been corrected, it is important to be in a position to restart quickly the supply of gas to the installation so that the installation functions once again and so that the subscriber can return quickly to normal life.

Object of the Invention

An object of the invention is to be able, quickly and in reliable manner, to detect a fluid leak occurring in a subscriber's installation, to make the installation safe, and to act quickly to restore the supply of fluid once the problem has been corrected.

SUMMARY OF THE INVENTION

In order to achieve this object, there is provided a fluid meter comprising:
  a first communication interface arranged both to communicate via a radio link with a communication interface of a cut-off unit including an electromechanical valve, and also to transmit electrical energy via the radio link, the electrical energy being adapted to power the communication interface of the cut-off unit;
  a first processor module arranged:
    to evaluate the flow rate of fluid being supplied to an installation connected to the fluid meter and, if the fluid flow rate remains greater than a first predetermined flow rate threshold for at least a first predetermined duration, to detect that there is a leak of fluid in the installation and transmit an internal command frame via the first communication interface to the communication interface of the cut-off unit, the internal command frame incorporating a closing command in order to close the electromechanical valve;
    following closing of the electromechanical valve, acquiring a first external command frame via the first communication interface, the first external command frame incorporating an opening command produced by the cut-off unit following manual action on an actuator member of the cut-off unit, producing an internal command frame incorporating the opening command, and transmitting said internal command frame via the first communication interface to the communication interface of the cut-off unit in order to reopen the electromechanical valve.

By evaluating the fluid flow rate, the fluid meter of the invention is thus capable, in real time, of detecting the occurrence of a leak of fluid in the installation. A leak of fluid in an installation has an impact on the fluid flow rate visible in the fluid meter connected to said installation, which impact is very fast and very clear, such that the fluid meter detects the occurrence of a leak of fluid quickly and in reliable manner.

When the fluid meter detects a leak of fluid, the first communication interface of the fluid meter powers the communication interface of the cut-off unit electrically and commands the cut-off unit to close the electromechanical valve and thereby interrupt the supply of fluid to the installation. The installation is thus made safe very quickly.

Once the problem has been put right, manual action on the actuator member of the cut-off unit, e.g. taken by the subscriber or by an operative of the network operator, serves to issue a command to the fluid meter, which in turn commands the electromechanical valve to reopen. The supply of fluid to the installation is thus restarted, and the installation becomes functional again very quickly.

There is also provided a fluid meter as described above, wherein, following transmission of the internal command frame and following reopening of the electromechanical valve, the first processor module is arranged to keep the electromechanical valve open only providing the fluid flow rate remains less than a second predetermined flow rate threshold for at least a second predetermined duration after reopening of the electromechanical valve.

There is also provided a fluid meter as described above, wherein the first processor modules is arranged to re-close the electromechanical valve or to keep it closed in the event of the fluid flow rate being greater a third predetermined flow rate threshold during at least a third predetermined duration.

There is also provided a fluid meter as described above, also comprising a second communication interface arranged to communicate with an external device other than the cut-off unit, the first processor module being arranged, following closing of the electromechanical valve, to acquire a second external command frame via the second communication interface, the second external command frame incorporating an opening command produced by the external device, to produce an internal command frame incorporating the opening command, and to transmit said internal command frame via the first communication interface to the communication interface of the cut-off unit in order to reopen the electromechanical valve.

There is also provided a fluid meter as described above, wherein the first communication interface is arranged to write the internal command frame in a memory of the cut-off unit, and then to read an acknowledgement frame in the memory of the cut-off unit.

There is also provided a fluid meter as described above, wherein the internal command frame incorporates the current value of an internal command frame counter that is incremented each time an internal command frame is transmitted by the fluid meter to the cut-off unit.

There is also provided a fluid meter as described above, further comprising authentication means arranged to authenticate the internal command frame.

There is also provided a fluid meter as described above, wherein the authentication means are arranged to encrypt at least part of the internal command frame by using an encryption algorithm having a symmetrical encryption key that is stored both in a memory of the fluid meter and also in a memory of the cut-off unit. There is also provided a method of making safe an installation, the method being performed in a fluid meter as described above and comprising the steps of:
- evaluating the flow rate of fluid being supplied to an installation connected to the fluid meter and, if the fluid flow rate remains greater than a first predetermined flow rate threshold for at least a first predetermined duration, transmitting an internal command frame via the first communication interface to the communication interface of the cut-off unit, the internal command frame incorporating a closing command in order to close the electromechanical valve;
- following closing of the electromechanical valve, acquiring a first external command frame via the first communication interface, the first external command frame incorporating an opening command produced by the cut-off unit following manual action on an actuator member of the cut-off unit, producing an internal command frame incorporating the opening command, and transmitting said internal command frame via the first communication interface to the communication interface of the cut-off unit in order to reopen the electromechanical valve.

There is also provided a computer program including instructions for causing the above-described fluid meter to execute the steps of the above-described method of making safe.

There is also provided a computer readable storage medium, having stored thereon the computer program as described above.

There is also provided a cut-off unit suitable for being mounted in the proximity of a fluid meter, and comprising:
- an electromechanical valve;
- a memory;
- a communication interface arranged to receive an internal control frame via a radio link and store it in the memory, the internal control frame incorporating an opening or closing command to open or close the electromechanical valve, the second communication interface also being arranged to receive electrical energy transmitted via the radio link, and to be powered thereby;
- an actuator member suitable for being actuated manually by a person situated in the proximity of the cut-off unit;
- a second processor module arranged to acquire the internal command frame in the memory, to decrypt the internal command frame and extract therefrom an opening or closing command in order to command opening or closing of the electromechanical valve, and to write an acknowledgement frame in the memory, the second processor module also being arranged to detect that the actuator member has been actuated, and following such actuation, to write a first external command frame in the memory representative of a manual actuation of the actuator member requesting the fluid meter to send a command for opening the electromechanical valve to the cut-off unit.

There is also provided a cut-off unit as described above, the actuator member being a pushbutton.

There is also provided a cut-off unit as described above, wherein the second processor module is to be found by default in a standby mode, and the communication interface is arranged to produce an activation signal for activating the second processor module when the second communication interface receives electrical energy.

There is also provided a cut-off unit as described above, wherein a symmetrical encryption key of an encryption algorithm is stored in the memory of the cut-off unit, the second processor being arranged to decrypt the internal control frame by using the symmetrical encryption key.

There is also provided a measurement system comprising a fluid meter as described above and a cut-off unit as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
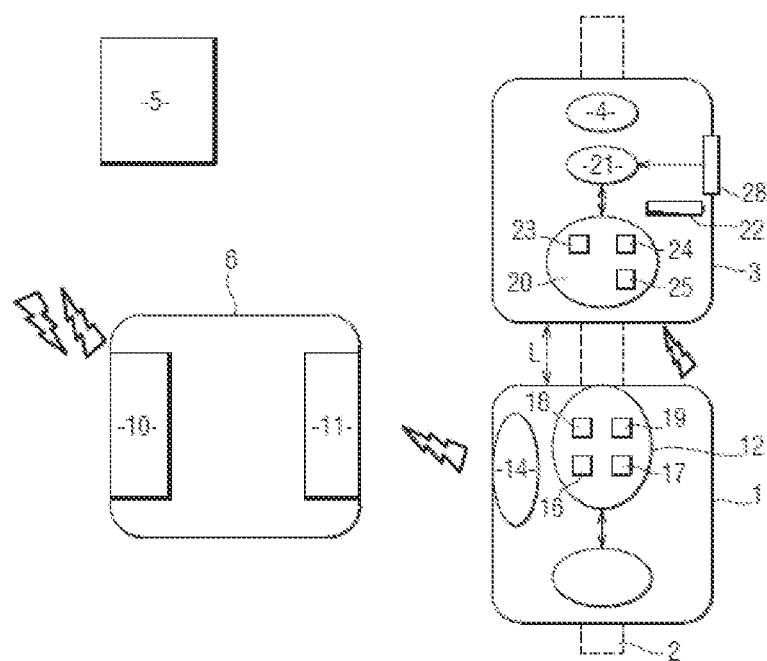
FIG. 1 shows an information system, a data concentrator, a gas meter, and a cut-off unit.
Figure 2:
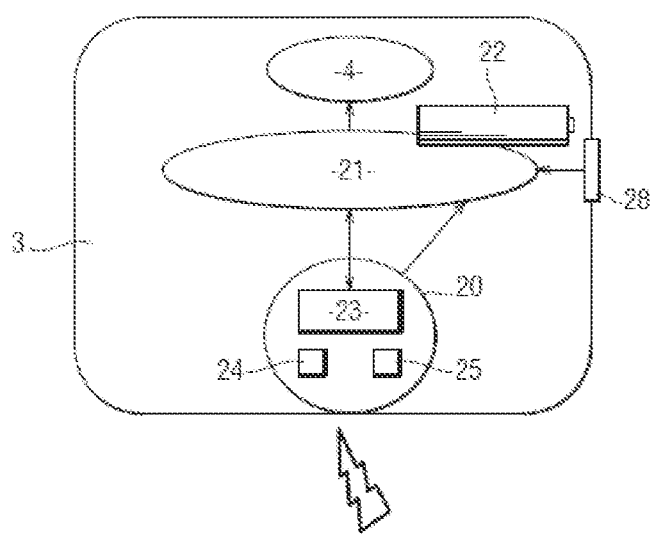
FIG. 2 shows the cut-off unit.

With reference to FIGS. 1 and 2, the fluid meter of the invention in this example comprises a gas meter 1 that is mounted on a pipe 2 of a natural gas distribution network and that is used for measuring the natural gas consumption of an installation.

A cut-off unit 3 is mounted on the pipe 2 in the proximity of the gas meter 1. The cut-off unit 3 may be situated upstream or downstream from the gas meter 1. The distance L between the gas meter 1 and the cut-off unit 3 may lie in the range 1 centimeter (cm) to 10 cm, for example. The cut-off unit 3 includes an electromechanical valve 4 that is used selectively to cut off or to re-establish the supply of gas to the installation.

In a nominal mode of operation, the commands for opening and closing the electromechanical valve 4 are issued by an information system (IS) 5 that transmits the opening or closing commands to the gas meter 1 via a data concentrator 6. The gas meter 1 relays these opening or closing commands to the cut-off unit 3.

Each of these entities is described briefly below.

The IS 5 comprises one or more servers and a communication module that enables it to communicate via a cellular network of 2G, 3G, or 4G type with data concentrators such as the data concentrator 6.

The data concentrator 6 comprises first communication means 10 for communicating with the IS 5 via a 2G, 3G, or 4G cellular network, and second communication means 11 for communicating with the gas meter 1. The second communication means 11 enable the data concentrator 6 to communicate by radio communication, making use in this example of the Wize standard operating at the frequency of 169 MHz.

The gas meter 1 is an ultrasonic meter. The gas meter 1 is a smart meter.

The gas meter 1 has a first communication interface 12 and a second communication interface 14.

In this example, the first communication interface 12 is a master near field communication (NFC) interface.

The first communication interface 12 firstly includes a first processor module that comprises a first processor component. By way of example, the first processor component may be a processor, a microcontroller, or indeed a programmable logic circuit such as a field programmable gate array (FPGA) or an application-specific integrated circuit (ASIC). In this example, the first processor component is a first microcontroller 16.

The first communication interface 12 also includes a first memory 17, an NFC transceiver 18, and a first antenna 19. In this example, the NFC transceiver 18 comprises an amplifier, a modulator, and a demodulator.

The second communication interface 14 is adapted to communicate via radio communication using the Wize standard operating at the frequency of 169 MHz. The second communication interface 14 enables the gas meter 1 to receive commands from the IS 5 via the data concentrator 6 for opening or closing the electromechanical valve 4.

The gas meter 1 further includes authentication means that, in this example, comprise a programmed software module in the first microcontroller 16 and a zone of the first memory 17.

In addition to the electromechanical valve 4, the cut-off unit 3 comprises a communication interface 20, which is a slave NFC interface in this example, a second processor module, and a battery 22. The second processor module comprises a second processor component that, by way of example, may be a processor, a microprocessor, or indeed a programmable logic circuit such as an FPGA or an ASIC. Specifically, the second processor component is a second microcontroller 21.

The communication interface 20 comprises a second memory 23, an NFC receiver 24, and a second antenna 25. By way of example, the NFC receiver 24 comprises a demodulator.

The second microcontroller 21 is arranged to act via a driver (not shown in figures) to command the electromechanical valve 4 to open or close. In this example, the second microcontroller 21 includes an inter-integrated circuit (I2C) interface for read and write accessing of the second memory 23.

The battery 22 of the cut-off unit 3 is used to power the second microcontroller 21 and the electromechanical valve 4 (together with the driver).

The cut-off unit 3 further comprises an actuator member suitable for being actuated by a person acting manually.

In this example, the actuator member is a pushbutton 28 that is situated on the cut-off unit 3 and that is thus accessible from outside the cut-off unit 3.

There follows a description of how the gas meter 1 detects a gas leak and makes the installation safe.

The first microcontroller 16 of the gas meter 1 acts in real time to evaluate the rate at which gas is being supplied to the installation that is connected to the gas meter 1.

The first microcontroller 16 compares the gas flow rate with a first predetermined flow rate threshold. Gas flow rate is a slope expressed as a quantity of gas as a function of time. In this example, the gas flow rate is expressed in cubic meters per second ($m^3/s$).

If the gas flow rate remains greater than the first predetermined flow rate threshold for at least a first predetermined duration, i.e. if:

$D>D_0$ for a continuous duration $T>T_0$;

where D is the gas flow rate, $D_0$ is the first predetermined flow rate threshold, and $T_0$ is the first predetermined duration;

then the first microcontroller 16 of the gas meter 1 detects that there is a gas leak in the installation.

In this example, $D_0$=0.000080 $m^3/s$ and $T_0$=900 seconds (s).

Specifically, such a gas flow rate over such a long duration does not correspond to normal consumption of the appliances in the installation, but reveals that there is a gas leak in the installation.

Figure 3:
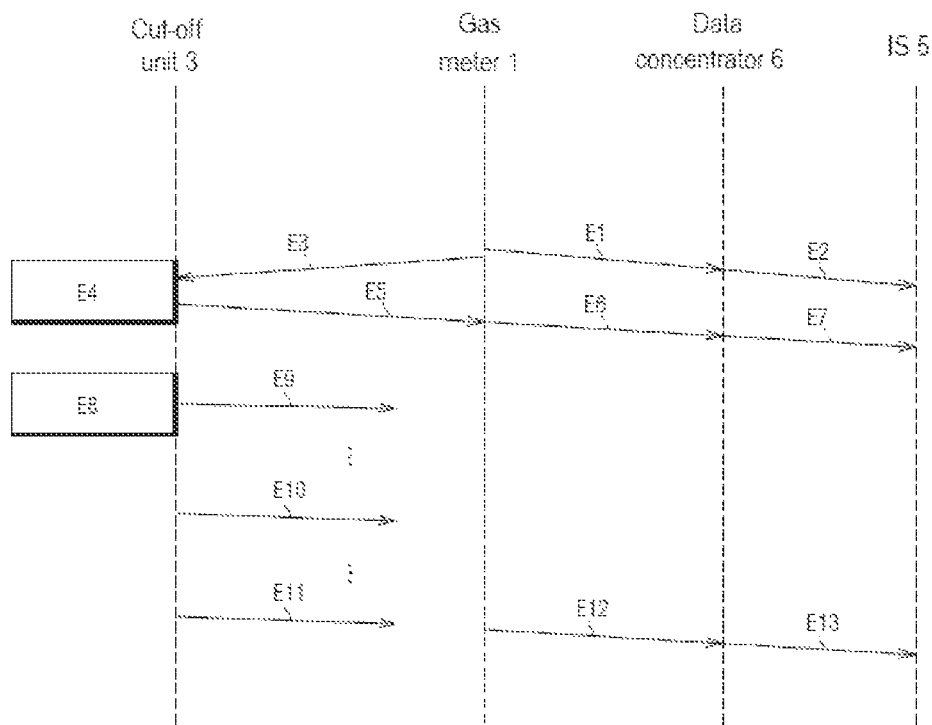
FIG. 3 shows exchanges of commands, frames, and messages between the FIG. 1 entities in the event of the gas meter detecting a gas leak.

With reference to FIG. 3, when the first microcontroller 16 of the gas meter 1 detects a gas leak, the first microcontroller 16 generates a gas leak alarm destined for the IS 5. The gas leak alarm is initially transmitted by the gas meter 1 to the data concentrator 6 by radio communication at 169 MHz (step E1), and it is then transmitted by the data concentrator 6 to the SI 5 via the 2G, 3G, or 4G network, using an http POST request and the TR-69 protocol (step E2).

Simultaneously, the first microcontroller 16 of the gas meter 1 produces an internal command frame that incorporates a command for closing the electromechanical valve 4 of the cut-off unit 3.

The internal command frame is authenticated by authentication means of the gas meter 1. Authentication consists in encrypting the command frame, at least in part.

The authentication means use an encryption algorithm having a "secret" symmetrical encryption key that is stored in the zone of the first memory 17 of the first communication interface 12.

The encryption algorithm is an advanced encryption standard (AES) algorithm using Galois counter mode (GCM). The encryption algorithm enables data to be encrypted and decrypted in 128-bit blocks. The symmetrical encryption key is a 128-bit key.

The symmetrical encryption key is also stored in the first zone of the second memory 23 of the communication interface 20 of the cut-off unit 3, and it is therefore known to the first communication interface 12 and to the communication interface 20. The gas meter 1 and the cut-off unit 3 are associated via this same symmetrical encryption key. By way of example, this association may be performed in the factory, once the gas meter 1 and the cut-off unit 3 have been manufactured, by loading the symmetrical encryption key into the first memory 17 of the gas meter 1 and into the second memory 23 of the cut-off unit 3. This association may also be performed during installation on site.

The first microcontroller 16 transmits the internal command frame to the communication interface 20 of the cut-off unit 3 via the first communication interface 12, and thus by using NFC technology, in order to close the electromechanical valve 4 (step E3).

By means of the NFC transceiver 18 and the first antenna 19, the first communication interface 12 produces for this purpose an electromagnetic field that induces electric current in the second antenna 25 of the communication interface 20. The electromagnetic field serves to form a radio link enabling the first communication interface 12 to transmit the internal command frame to the communication interface 20 and also to transmit electrical energy that powers the communication interface 20. The communication interface 20 is therefore not powered by the battery 22 of the cut-off unit 3, but only by the electrical energy transmitted via the radio link.

In order to optimize the transmission of electrical energy, it should be observed at this point that the first antenna 19 and the second antenna 25 are positioned facing each other with each of them extending in a plane perpendicular to the axis passing through their respective centers.

The first communication interface 12 then writes the internal command frame in a second zone of the second memory 23 of the communication interface 20.

By default, the second microcontroller 21 of the cut-off unit 3 is generally to be found in a standby mode. When the communication interface 20 receives the electrical energy transmitted by the first communication interface 12, it produces an activation signal that wakes up the second microcontroller 21.

The activation signal is an interrupt signal applied to a pin of the second microcontroller 21. In a variant, it would also be possible to use a "memory busy" type signal generated by the communication interface 20 for the purpose of waking up the second microcontroller 21.

The second microcontroller 21 then accesses the internal command frame by reading in the second zone of the second memory 23. By knowing the symmetrical encryption key, the second microcontroller 21 decrypts the internal command frame, extracts the closing command from the internal command frame, and commands the electromechanical valve 4 to close.

Thereafter, after closing the electromechanical valve 4, the second microcontroller 21 writes an acknowledgement frame in a third zone of the second memory 23 of the communication interface 20, the acknowledgement frame including an acknowledgement for the first communication interface 12 of the gas meter 1 (step E4).

The second microcontroller 21 authenticates the acknowledgement frame by using the above-mentioned encryption algorithm.

The first communication interface 12 of the gas meter 1 accesses the third zone of the second memory 23 of the communication interface 20 in order to attempt to read an acknowledgement frame in the third zone of the second memory 23 (step E5). Reading is performed by a polling method: at regular intervals, the first communication interface 12 accesses the content of the third zone of the second memory 23 in order to determine whether an acknowledgement frame is indeed to be found in the third zone of the second memory 23.

If the acknowledgement frame is indeed present on the first read attempt, the gas meter 1 itself returns an acknowledgement message to the data concentrator 6 (step E6). The data concentrator 6 relays the acknowledgement message to the IS 5 (step E7).

After the internal command frame has been transmitted to the cut-off unit 3, if no acknowledgement frame is stored in the third zone of the second memory 23 (step E8), the first read attempt fails (step E9). The first communication interface 12 then makes a second read attempt (step E10). If this attempt fails, the first communication interface 12 makes a third read attempt (step E11). Each read attempt is spaced apart from the preceding read attempt by a predetermined duration, which is equal to 1 minute (min) in this example. After a predetermined number of unsuccessful read attempts, equal to 3 in this example, the gas meter 1 returns an error message to the data concentrator 6 (step E12). The data concentrator 6 relays the error message to the SI 5 and transmits an alert to inform of the SI 5 that the electromechanical valve 4 of the cut-off unit 3 has not been closed (step E13).

The first microcontroller 16 of the first communication interface 12 operates an internal command frame counter, and its current value is included in each internal command frame. The internal command frame counter is incremented by the first microcontroller 16 each time an internal command frame is transmitted by the gas meter 1 to the cut-off unit 3.

The internal command frame counter serves to avoid an internal command frame being "played back", i.e. to avoid an old internal command frame that has been received and acquired by an ill-intentioned person being used to produce an opening or closing command for fraudulently controlling the cut-off unit 3. Thus, when the second microcontroller 21 of the cut-off unit 3 acquires an internal command frame, it verifies that the current value of the internal command frame counter, as included in said internal command frame, is strictly greater than the value included in the preceding internal command frame.

Likewise, the second microcontroller 21 of the cut-off unit 3 operates an acknowledgement frame counter that is incremented each time the second microcontroller 21 produces an acknowledgement frame, with the current value of that counter being included in the acknowledgement frame.

Once the IS 5 has received the gas leak alarm, an operative comes to observe and correct the problem that caused the gas leak. The subscriber might also put right the problem that gave rise to the leak without outside help.

When either of those people considers that the problem has been put right and there is no longer any risk, that person acts locally to cause the electromechanical valve 4 to open by acting manually on the pushbutton 28 of the cut-off unit 3. The manual action is a long press. The long press is a press of duration longer than a predetermined threshold, e.g. equal to 2 s. The long press on the pushbutton 28 wakes up the second microcontroller 21 of the cut-off unit 3.

Figure 4:
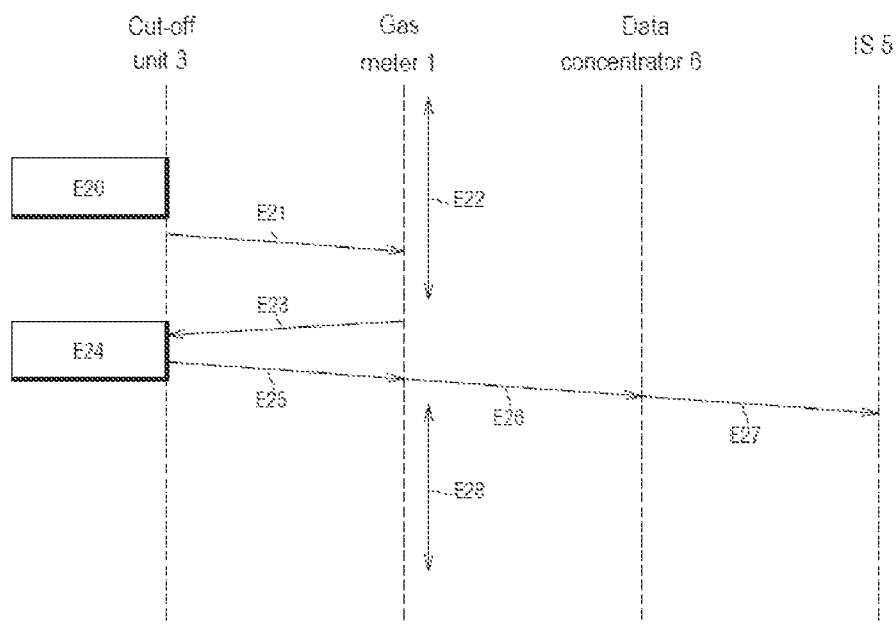
FIG. 4 shows exchanges of commands, frames, and messages between the FIG. 1 entities in the event of the electromechanical valve being reopened by acting manually on an actuator member of the cut-off unit.

With reference to FIG. 4, when the second microcontroller 21 of the cut-off unit 3 has been woken up and detects this long press on the pushbutton 28, the second microcontroller 21 writes a first external command frame in the third zone of the second memory 23 of the communication interface 20 destined for the first communication interface 12 of the gas meter 1, which first external command frame indicates manual action has been taken on the actuator member of the cut-off unit 3 requesting the gas meter 1 to send a command for opening the electromechanical valve 4 to the cut-off unit 3 (step E20).

The first communication interface 12 of the gas meter 1 accesses the third zone of the second memory 23 of the communication interface 20 in order to attempt to read the first external command frame in the third zone of the second memory 23 (step E21).

Reading is performed once again by a polling method. After the gas meter 1 has detected a leak and has commanded the electromechanical valve 4 to close, the gas meter 1 performs polling that is slow and regular. At regular intervals, the first communication interface 12 accesses the content of the third zone of the second memory 23 in order to determine whether a first external command frame is indeed to be found in the third zone of the second memory 23 (step E22).

Each regular interval may be of fixed duration, e.g. equal to 5 min.

The regular intervals may also be of duration that is variable, e.g. increasing over time. Thus, by way of example, the duration of the regular intervals may be multiplied by 2 once every 6 hours (h), until reaching a maximum duration that is equal to 24 h (i.e. multiplication by 2 is stopped on reaching or exceeding 24 h).

The first communication interface 12 of the gas meter 1 acquires the first external command frame when that frame is present.

The first microcontroller 16 of the gas meter 1 then decides to reopen the electromechanical valve 4.

The first microcontroller 16 produces an internal command frame that incorporates a command for opening the electromechanical valve 4 of the cut-off unit 3.

The first microcontroller 16 transmits the internal command frame to the communication interface 20 of the cut-off unit 3 via the first communication interface 12, in order to reopen the electromechanical valve 4 (step E23). More precisely, The first communication interface 12 writes the internal command frame in a second zone of the second memory 23 of the communication interface 20. The second microcontroller 21 accesses the internal command frame and decrypts it, and then it commands the electromechanical valve 4 to reopen.

Thereafter, after reopening the electromechanical valve 4, the second microcontroller 21 writes an acknowledgement frame in a third zone of the second memory 23 of the communication interface 20, the acknowledgement frame including an acknowledgement for the first communication interface 12 of the gas meter 1 (step E24). Once again, the first communication interface 12 of the gas meter 1 uses a polling method to access the third zone of the second memory 23 of the communication interface 20 in order to attempt to read an acknowledgement frame in the third zone of the second memory 23 (step E25). If the acknowledgement frame is indeed present, the gas meter 1 itself returns an acknowledgement message to the data concentrator 6 (step E26). The data concentrator 6 relays the acknowledgement message to the IS 5 (step E27).

It should be observed that, after the internal command frame incorporating the opening command has been transmitted and after the electromechanical valve 4 has been reopened, the first microcontroller 16 keeps the electromechanical valve 4 open only providing it observes that no gas is consumed during at least a second predetermined duration after reopening of the electromechanical valve 4, i.e. providing the gas flow rate remains less than a second predetermined flow rate threshold for at least the second predetermined duration (step E28).

Thus, the gas meter 1 leaves the electromechanical valve 4 open only if:

$D<D_1$ for a continuous duration $T>T_1$;

where D is the gas flow rate, $D_1$ is the second predetermined flow rate threshold, and $T_1$ the second predetermined duration.

In this example, $D_1=0.000040$ m$^3$/s and $T_1=10$ s.

Specifically, since the electromechanical valve 4 was previously closed, the installation was not consuming gas at the time when the electromechanical valve 4 was reopened, so the gas meter 1 will not observe any flow of gas on reopening the electromechanical valve 4, except in the event that a gas leak is still present in the installation.

Finally, whatever happens, and whatever the situation, the first microcontroller 16 of the gas meter 1 re-closes the electromechanical valve 4 (if it was open) or keeps it closed (if it was closed) in the event of the gas flow rate being greater than a third predetermined flow rate threshold for at least a third predetermined duration.

Thus, under all circumstances, if the first microcontroller 16 observes that $D>D_2$ over a continuous duration $T>T_2$;

where D is the gas flow rate, $D_2$ is the third predetermined flow rate threshold, and $T_2$ is the third predetermined duration;

then the gas meter 1 closes the electromechanical valve 4 or keeps it closed whatever happens.

In this example, $D_2=0.01$ m$^3$/s and $T_2=20$ s.

Specifically, such a gas flow rate is too large to be drawn by one or more appliances of the installation in normal operation, such that this flow rate is necessarily the result of a leak and must be interrupted quickly.

It should be observed that the second microcontroller 21 of the cut-off unit 3 implements a counter of first external command frames, which counter is incremented each time the second microcontroller 21 produces a first external command frame, with the current value of the counter being incorporated in the first external command frame.

Figure 5:
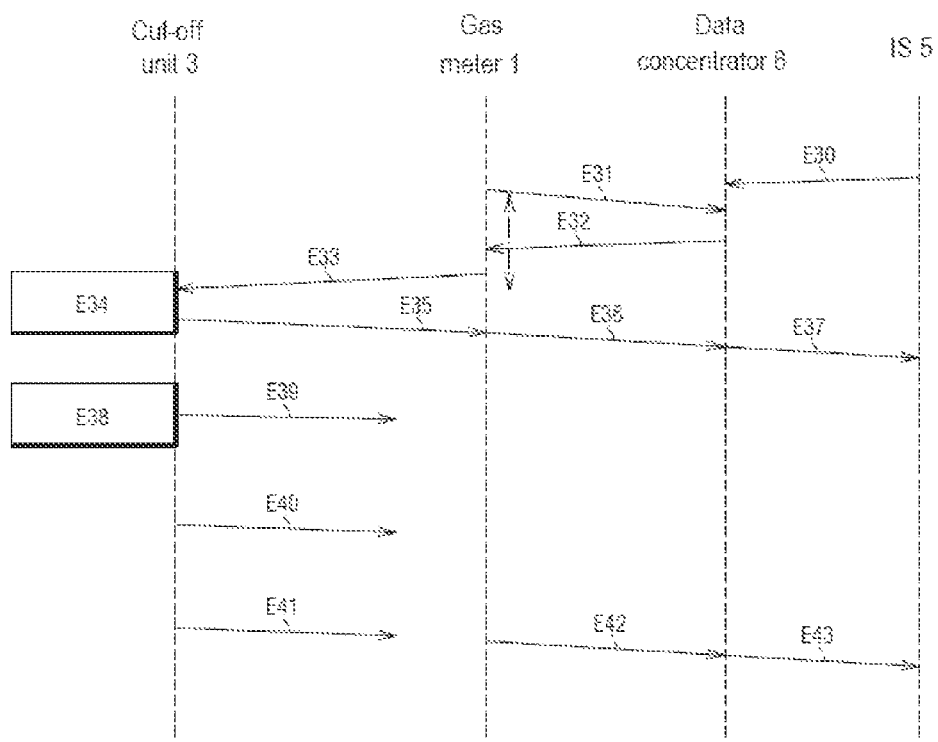
FIG. 5 shows exchanges of commands, frames, and messages between the FIG. 1 entities in the event of the electromechanical valve being reopened by the IS.

Alternatively, and with reference to FIG. 5, the IS 5 can perfectly well act via the data concentrator 6 and the gas meter 1 to command re-opening of the electromechanical valve 4.

The IS 5 produces a command for opening the electromechanical valve 4 of the cut-off unit 3, and transmits the opening command to the data concentrator 6 by using an http POST request of the TR-69 protocol (step E30).

At regular intervals, the gas meter 1 sends a collect frame to the data concentrator 6 (step E31).

The data concentrator 6 waits to receive the collect frame, and when it does receive the collect frame, the data concentrator 6 acts in the listening window of the gas meter 1 to send a second external frame incorporating the opening command (step E32). For this purpose, the data concentrator 6 uses radio communication using the Wize standard operating at the frequency of 169 MHz.

The first microcontroller 16 of the gas meter 1 acquires the second external command frame via the second communication interface 14, and it produces an internal command frame incorporating the command for opening the electromechanical valve 4 of the cut-off unit 3.

The internal command frame is authenticated by authentication means of the gas meter 1.

The gas meter 1 then transmits the internal command frame to the cut-off unit 3 by using NFC technology, in the same manner as described above (step E33).

The second microcontroller 21 of the cut-off unit 3 commands the electromechanical valve 4 to open.

Thereafter, once the electromechanical valve 4 has opened, the second microcontroller 21 produces and authenticates the acknowledgement frame, and then writes it in the second memory 23 (step E34).

The first communication interface 12 attempts to read an acknowledgement frame in the second memory 23 (step E35). The reading is performed using the above-described polling method.

If the acknowledgement frame is indeed present on the first read attempt, the gas meter 1 returns an acknowledgement message to the data concentrator 6 (step E36) which returns it to the IS 5 (step E37).

After the internal command frame has been transmitted to the cut-off unit 3, if no acknowledgement frame is stored in the third zone of the second memory 23 (step E38), the first read attempt fails (step E39). The first communication interface 12 then makes a second read attempt (step E40). If this attempt fails, the first communication interface 12 makes a third read attempt (step E41). Each read attempt is spaced apart from the preceding read attempt by a predetermined duration, which is equal to 1 min in this example. After a predetermined number of unsuccessful read attempts, equal to 3 in this example, the gas meter 1 returns an error message to the data concentrator 6 (step E42), which returns it to the IS 5 (E43).

It should be observed that FIG. 5 also corresponds to "nominal" operation of the system: when no gas leak anomaly is detected, it is the IS 5 that produces the opening or closing commands for actuating the electromechanical valve 4 of the cut-off unit 3.

Figure 6:
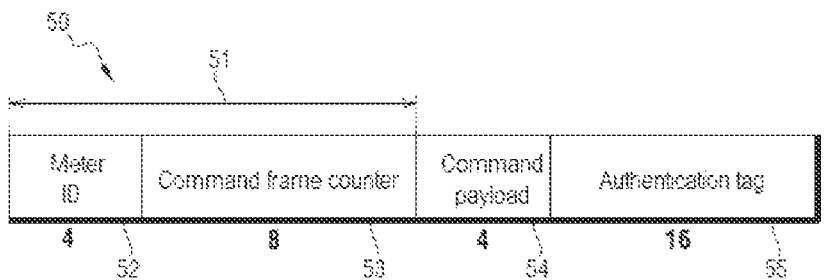
FIG. 6 shows an internal command frame.

With reference to FIG. 6, there follows a more detailed description of the structure of an internal command frame produced by the gas meter 1 for sending to the cut-off unit 3.

An internal command frame 50 comprises firstly an initial value IV 51 that is not encrypted and that complies with the recommendation of NIST special publication 800-38, chapter 8.2.1.

The initial value IV 51 is subdivided into a first field 52 and a second field 53.

The first field 52 is a 4-byte field that contains an identifier of the issuer of the message, specifically an identifier of the gas meter 1.

The second field 53 is an 8-byte field that contains the current value of the internal command frame counter. The second field 53 allows for more than $18 \times 10^{18}$ commands without changing the symmetrical encryption key, and it is reinitialized to 0 each time the symmetrical key is changed.

Thereafter, the internal command frame 50 comprises a payload 54, which is a functional field for identifying the function of the frame: opening command, closing command, or acknowledgement. The payload 54 is encrypted by the AES encryption algorithm using the GCM mode of operation, and it comprises 4 bytes.

The payload 54 has one control byte that takes one of the following values:
- '0': for a command to open the electromechanical valve 4. This is an internal command frame coming from the gas meter 1;
- '1': for a command to close the electromechanical valve 4. This is an internal command frame coming from the gas meter 1; or
- '2': for an acknowledgement. This is an acknowledgement frame coming from the cut-off unit 3.
- '3': for a long press made on the pushbutton 28. This is a first external command frame coming from the cut-off unit 3 and incorporating an opening command.

The control byte in the payload 54 of the internal command frame 50 thus has the value '0' for an opening command and the value '1' for a closing command.

The payload 54 also has 3 bytes that are not used.

It should be observed that the encryption algorithm used generates a 16-byte random number from the command byte.

The internal command frame 50 then has a 16-byte message authentication code 55 (also known as a "tag") that is generated by the AES encryption algorithm using the GCM mode of operation. The message authentication code 55 serves to authenticate the internal command frame 50, to ensure the integrity of the data that it contains, and to confirm that the internal command frame 50 does indeed come from an expected issuer (specifically the gas meter 1).

Figure 7:
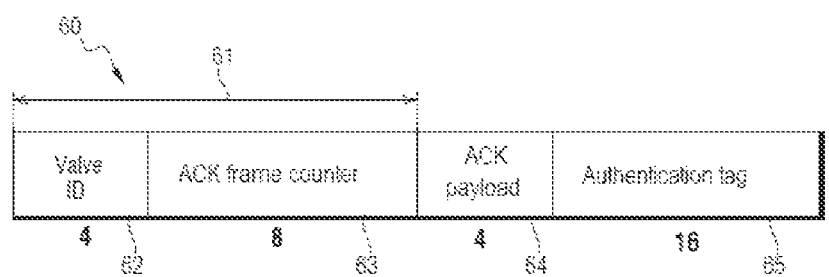
FIG. 7 shows an acknowledgement frame.

With reference to FIG. 7, there follows a description of an acknowledgement frame produced by the cut-off unit 3 and destined for the gas meter 1.

An acknowledgement frame 60 comprises firstly an initial value IV 61 subdivided into a first field 62 and a second field 63.

The first field 62 is a 4-byte field that contains an identifier of the issuer of the message, specifically an identifier of the cut-off unit 3.

The second field 63 is an 8-byte field that contains the current value of the acknowledgement frame counter. The second field 63 allows for more than $18 \times 10^{18}$ acknowledgements without changing the symmetrical encryption key, and it is reinitialized to 0 each time the symmetrical key is changed.

Thereafter, the acknowledgement frame 60 comprises a payload 64 encrypted by the AES encryption algorithm using the GCM mode of operation, and occupying 4 bytes.

The command byte of the payload 64 of the acknowledgement frame 60 has the value '2'.

The payload 64 also has 3 bytes that are not used.

It should be observed that the encryption algorithm used generates a 16-byte random number from the command byte.

The acknowledgement frame 60 then has a 16-byte message authentication code 65 (also known as a "tag") that is generated by the AES encryption algorithm using the GCM mode of operation. The message authentication code 65 serves to authenticate the acknowledgement frame 60, to ensure the integrity of the data that it contains, and to confirm that the acknowledgement frame 60 does indeed come from an expected issuer (specifically the cut-off unit 3).

It should be observed that a first external command frame, as produced by the cut-off unit 3 after a long press on the pushbutton 28, is of structure quite similar to the structures described above. The payload command byte of the first external command frame has the value '3'.

Finally, it should be observed that the gas meter 1 has the advantage of being capable, on its own, of detecting a leak and of cutting off the supply. There is no need to add an additional device to the system, such as a buffer chamber in the network that fills and empties like a dynamic storage battery.

Naturally, the invention is not limited to the embodiment described, but covers any variant coming within the ambit of the invention as defined by the claims.

The control and hardware architectures of the IS, of the data concentrator, of the gas meter, and of the cut-off unit could be different from those described above. For example, above, a certain number of tasks that are performed by the first microcontroller of the gas meter could be performed by some other processor component of the gas meter, which need not necessarily form part of the first communication interface.

The communication technologies and protocols serving to interconnect the IS, the data concentrator, the gas meter, and the cut-off unit, could be different from those described above.

The first communication interface of the meter and the communication interface of the cut-off unit need not necessarily be NFC interfaces. A technology or a protocol of some other type could be used, and for example a so-called "proprietary" technology and protocol. Any radio link that makes it possible to transmit both data (commands, acknowledgements, etc.) and also sufficient electrical energy to power a communication interface comes within the ambit of the invention.

The second communication interface of the meter enables it to communicate with an external device, other than the cut-off unit, which need not necessarily be a data concentrator, but that could be a gateway, or indeed the IS directly.

The invention may naturally be implemented in a meter used for measuring consumption of any type of fluid: gas, liquid, oil, etc.

Other encryption algorithms could be used, and for example the Twofish, Serpent, and/or Blowfish algorithms. More generally, the authentication means could be different from those described above. It is possible to use any authentication means capable of certifying the authenticity of a frame.

The invention claimed is:

1. A fluid meter, comprising:
   a first communication interface communicating via a radio link with a communication interface of a cut-off unit, which is remotely positioned outside of the fluid meter, comprising an electromechanical valve, and also transmitting electrical energy via the radio link, the electrical energy powering the communication interface of the cut-off unit, such that the communication interface is not powered by a battery of the cut-off unit but only by the electrical energy transmitted by the radio link;
   a first processor module arranged:
      to evaluate a flow rate of fluid being supplied to an installation connected to the fluid meter and, if the flow rate of fluid remains greater than a first predetermined flow rate threshold for at least a first predetermined duration, to detect that there is a leak of fluid in the installation and transmit an internal command frame via the first communication interface to the communication interface of the cut-off unit, the internal command frame incorporating a closing command in order to close the electromechanical valve; and
      following closing of the electromechanical valve, to acquire a first external command frame via the first communication interface, the first external command frame incorporating an opening command and being produced by the cut-off unit following a manual action on an actuator member of the cut-off unit, to produce an internal command frame incorporating the opening command, and to transmit said internal command frame via the first communication interface to the communication interface of the cut-off unit in order to reopen the electromechanical valve.

2. The fluid meter according to claim 1, wherein, following transmission of the internal command frame and following reopening of the electromechanical valve, the first processor module is arranged to keep the electromechanical valve open only providing the fluid flow rate remains less than a second predetermined flow rate threshold for at least a second predetermined duration after reopening of the electromechanical valve.

3. The fluid meter according to claim 1, wherein the first processor module is arranged to re-close the electromechanical valve or to keep it closed in the event of the fluid flow rate being greater a third predetermined flow rate threshold during at least a third predetermined duration.

4. The fluid meter according to claim 1, also comprising a second communication interface arranged to communicate with an external device other than the cut-off unit, the first processor module being arranged, following closing of the electromechanical valve, to acquire a second external command frame via the second communication interface, the second external command frame incorporating an opening command produced by the external device, to produce an internal command frame incorporating the opening command, and to transmit said internal command frame via the first communication interface to the communication interface of the cut-off unit in order to reopen the electromechanical valve.

5. The fluid meter according to claim 1, wherein the first communication interface is arranged to write the internal command frame in a memory of the cut-off unit, and then to read an acknowledgement frame in the memory of the cut-off unit.

6. The fluid meter according to claim 5, wherein the internal command frame incorporates the current value of an internal command frame counter that is incremented each time an internal command frame is transmitted by the fluid meter to the cut-off unit.

7. The fluid meter according to claim 1, further comprising authentication means arranged to authenticate the internal command frame.

8. The fluid meter according to claim 7, wherein the authentication means are arranged to encrypt at least part of the internal command frame by using an encryption algorithm having a symmetrical encryption key that is stored both in a memory of the fluid meter and also in a memory of the cut-off unit.

9. A method of making safe an installation, the method being performed in a fluid meter according to claim 1, and comprising the steps of:
   evaluating a flow rate of fluid being supplied to an installation connected to the fluid meter and, if the fluid flow rate remains greater than a first predetermined flow rate threshold for at least a first predetermined duration, transmitting an internal command frame via the first communication interface to the communication interface of the cut-off unit, the internal command frame incorporating a closing command in order to close the electromechanical valve; and
   following closing of the electromechanical valve, acquiring a first external command frame via the first communication interface, the first external command frame incorporating an opening command produced by the cut-off unit following manual action on an actuator member of the cut-off unit, producing an internal command frame incorporating the opening command, and transmitting said internal command frame via the first communication interface to the communication interface of the cut-off unit in order to reopen the electromechanical valve.

10. A non-transitory computer-readable storage medium having stored thereof a computer program including instructions for causing the fluid meter according to claim 1 to execute steps of a method of making safe an installation, the method being performed in the fluid meter according to claim 1, and comprising the steps of:
   evaluating a flow rate of fluid being supplied to an installation connected to the fluid meter and, if the fluid flow rate remains greater than a first predetermined flow rate threshold for at least a first predetermined duration, transmitting an internal command frame via the first communication interface to the communication interface of the cut-off unit, the internal command frame incorporating a closing command in order to close the electromechanical valve; and following closing of the electromechanical valve, acquiring a first external command frame via the first communication interface, the first external command frame incorporating an opening command produced by the cut-off unit following manual action on an actuator member of the cut-off unit, producing an internal command frame incorporating the opening command, and transmitting said internal command frame via the first communication interface to the communication interface of the cut-off unit in order to reopen the electromechanical valve.

11. A measurement system including a fluid meter according to claim 1 and a cut-off unit suitable for being mounted in the proximity of a fluid meter, and the cut-off unit comprising:

an electromechanical valve;

a memory;

a communication interface arranged to receive an internal control frame via the radio link and store it in the memory, the internal control frame incorporating an opening or closing command to open or close the electromechanical valve, a second communication interface also being arranged to receive electrical energy transmitted via the radio link, and to be powered thereby;

an actuator member suitable for being actuated manually by a person situated in the proximity of the cut-off unit; and a second processor module arranged to acquire the internal command frame in the memory, to decrypt the internal command frame and extract therefrom an opening or closing command in order to command opening or closing of the electromechanical valve, and to write an acknowledgement frame in the memory, the second processor module also being arranged to detect that the actuator member has been actuated, and following such actuation, to write a first external command frame in the memory representative of a manual actuation of the actuator member requesting the fluid meter to send a command for opening the electromechanical valve to the cut-off unit.

* * * * *